United States Patent [19]

Humphrey

[11] 3,828,999
[45] Aug. 13, 1974

[54] PACKAGE INCLUDING DISPOSABLE UTENSIL

[76] Inventor: Dallas R. Humphrey, 2780 N. 2nd St., St. Paul, Minn. 155109

[22] Filed: Oct. 24, 1972

[21] Appl. No.: 300,201

[52] U.S. Cl. .............................. 229/1.5 C, 30/326
[51] Int. Cl. ...................... B65d 77/30, A47j 43/28
[58] Field of Search ............. 229/1.5 C; 215/DIG. 5; 30/151, 322, 324, 325, 328

[56] References Cited
UNITED STATES PATENTS

| | | | |
|---|---|---|---|
| 1,128,114 | 2/1915 | Doellinger | 30/324 |
| 1,521,768 | 1/1925 | Herrmann | 30/328 |
| 2,598,987 | 6/1952 | Franzen | 229/1.5 C |
| 3,126,629 | 3/1964 | Claisse | 30/151 |

FOREIGN PATENTS OR APPLICATIONS

| | | | |
|---|---|---|---|
| 67,177 | 12/1943 | Norway | 30/324 |
| 437,392 | 10/1935 | Great Britain | 229/1.5 C |

*Primary Examiner*—Al Lawrence Smith
*Assistant Examiner*—J. C. Peters
*Attorney, Agent, or Firm*—John C. Barnes

[57] ABSTRACT

An eating utensil adapted to be conveniently packaged with vendable foods and easily formed to a shape for aiding the consumption of the packaged food product. The utensil is a thin blank having a rectangular portion and a rounded end portion. The rectangular portion is formed with fold lines dividing it into three long narrow areas. The portion is folded along the fold lines to form the handle and snap fasteners formed on opposite edges of the rectangular portion interlock to hold the areas in the folded position and the handle has a triangular cross section. The fold lines are extended into the end portion causing it to form a bowl as the handle is formed.

The utensil is easily packaged between sealed strips of sheet material and may be placed on a can or carton beneath the product label or the package may form part of the product label.

10 Claims, 6 Drawing Figures

PATENTED AUG 13 1974 3,828,999

PACKAGE INCLUDING DISPOSABLE UTENSIL

BACKGROUND OF THE INVENTION

This invention relates to an improvement in disposable devices to be formed into shape for a single purpose after which it may be discarded. In one aspect the present invention relates to an improved utensil for the consumption of vended food products and in another, to an improved utensil blank to be packaged with vendable food containers, i.e. cups, cans, bottles, boxes, etc.

Many attempts have been made, and the prior art is replete with varying forms of disposable utensil designs for use with edible products which may be vended or distributed in a single service container. The most remembered is the flat wooden blade to eat ice cream. This blade was effective until such time as the ice cream melted. Other designs which required the user to construct the utensil have been proposed to overcome this noticeable deficiency of the wooden spoon.

The first of these designs may have been the sanitary picnic spoon shown in U.S. Pat. No. 1,128,114, issued in 1915. This spoon is described to be constructed of a pliable material which is cut into the required form to be adjusted upon itself to form a complete spoon, consisting of a handle and bowl. The handle members were secured by cooperating slots to form the handle and spoon bowl. This spoon design left a handle with only two significant dimensions which could cause trouble in eating anything but the soft ice cream. In 1925 a patent to a paper spoon, U.S. Pat. No. 1,521,768, issued. This design provided a handle which was generally V-shaped in section with a similar V-shaped bowl. This design would tend to open easily during use, causing the V-shaped handle to lose its effectiveness when any force against opposite edges of the bowl were encountered.

Other prior art includes the spoon blank described in U.S. Pat. No. 3,458,107. This blank may have the edges of the handle portion folded to give the handle some strength but generally the spoon has the shape of the wooden blade and is effective for only eating relatively soft, mushy products.

At present, most vending areas are provided with a box of either molded brittle plastic spoons of the conventional shape or the wooden blade. This supply is not always there however because the earlier customers have taken an extra spoon just in case one breaks. This results in an undesirable situation because the later customer either doesn't buy the product, seeing he has no eating utensil, or buys it and becomes outraged at the vending service people, proprietor, and/or food manufacturer that has not provided the necessary aid for him to remove the food from its container and place it in his mouth.

BRIEF SUMMARY OF THE INVENTION

It is an object of this invention to provide a utensil which is easily packaged with each container of the food product.

It is another object of this invention to provide a blank which is easily formed into a sturdy utensil for eating most vended food products. It can also be used to scrape out hard ice cream, and should the utensil bend, it will not be damaged irreparably.

It is another object of this invention to provide a utensil which has a pliable blank, but when constructed to its proper form, has appreciable strength.

The utensil illustrated is a spoon comprising a handle and bowl. The spoon is formed from a thin blank which has been molded with grooves forming fold lines. The blank has a generally rectangular portion which is long and narrow and divided into three narrower areas or parts by a pair of fold lines. Along opposite edges of the rectangular portion are cooperating extensions defining fastening means for holding the opposite edges together when the rectangular portion is folded along the fold lines to form the handle. At one end of the rectangular portion is an enlarged rounded portion or bulbous end. The fold lines on the rectangular portion coverge and join at a radius within the bulbous end portion. A third fold line, beginning nearer the center of the bulbous end than said radius joining said first fold lines, diverges therefrom toward the edges of the rectangular portion along the converging portions at the ends of the first and second fold lines. The third fold line cooperates with the fold lines in the handle to draw the bulbous end into a bowl with the end of the center area of the handle terminating near the center of the bowl.

The utensil blank may be packaged between two thin strips of one sheet of material or two sheets, which material may be coated paper, cellophane, polymeric material, etc. This flat package may be wrapped upon the surface of a food container. The exposed side of the package may be the container label or the regular label may be applied over the package to hold it to the container. The flexibility of the blank also permits it to be folded and placed on an end of the container.

BRIEF DESCRIPTION OF THE DRAWING

The present invention is illustrated by way of example in the accompanying drawings which form a part of this application and in which.

DESCRIPTION OF A PREFERRED EMBODIMENT

Figure 1:
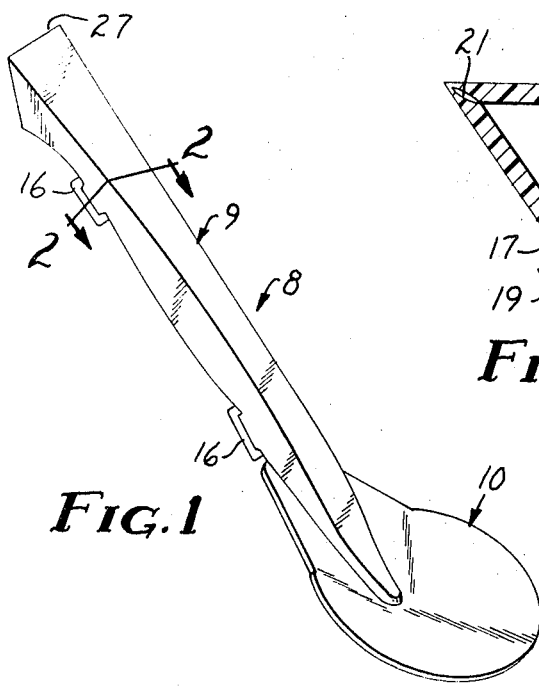
FIG. 1 is a perspective view of a spoon formed in accordance with the present invention.
Figure 3:
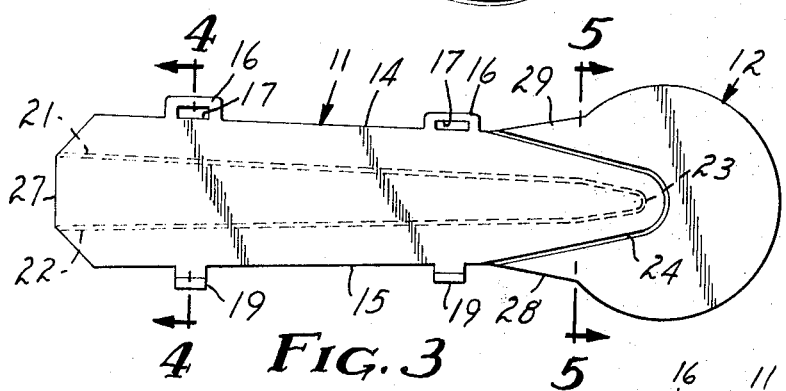
FIG. 3 is a plan view of the blank to form the spoon of FIG. 1.

Referring now to the drawing there is shown in FIG. 1 a disposable utensil 8 which comprises a handle 9 and a bowl-shaped portion 10. The utensil illustrated is a spoon which has been formed from a blank having a shape according to that of FIG. 3. The blank is preferably molded in a pair of cooperating dies, and the blank is a monolithic thin platelet member including a generally rectangular portion 11 which defines the handle portion 9 and at one end of the rectangular portion 11 is a rounded end or bulbous end 12 which forms the bowl 10 of the spoon. The end portion 12 may be further formed with teeth or extending tines. With these modifications, the utensil may take the shape of a fork or the teeth may increase its ability to cut or scrape various food products and generate bite size portions thereof.

Figure 2:
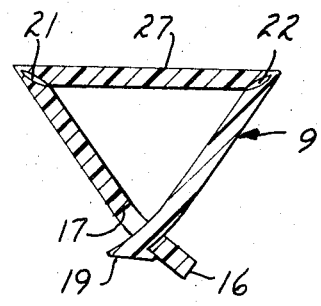
FIG. 2 is a section taken along the line 2—2 of FIG. 1.

The rectangular portion 11 has opposite edges 14 and 15. Along these edges are projecting portions which cooperate to form fastening means for holding the rectangular portion in the folded position shown in FIG. 1. As illustrated, the fastening means comprise a pair of ears 16 formed in spaced positions along the edge 14. The ears 16 have slots 17 which receive therethrough the extensions 19 formed in similarly spaced relation along the edge 15. The extensions 19 have a hook shape as shown in FIGS. 2 and 4, and the hook extends upward from the extension 19 toward the top of the blank.

The rectangular portion 11 is divided into three long narrow generally rectangular areas or parts by a first and second fold line extending lengthwise of the rectangular portion 11. The fold lines are indicated by numerals 21 and 22, however, they converge toward one end of the rectangular portion and extend into the bulbous end 12 where they meet at a connecting curved portion or fold line 23 to form one continuous fold line. The fold line 23 is spaced slightly (0.1–0.2 inch) from the center of the bulbous end 12. A third fold line 24 commences with a curved portion substantially at the center of the bulbous end and diverges therefrom toward the edges 14 and 15 of the rectangular portion 11. The third fold line extends generally parallel to the converging portions of fold lines 21 and 22 and is slightly spaced therefrom. The third fold line 24 coacts with the fold lines 21 and 22 to draw the bulbous end of the blank into a bowl with the end of the center area of the handle terminating near the center of the bowl, as shown in FIG. 1.

Figure 4:
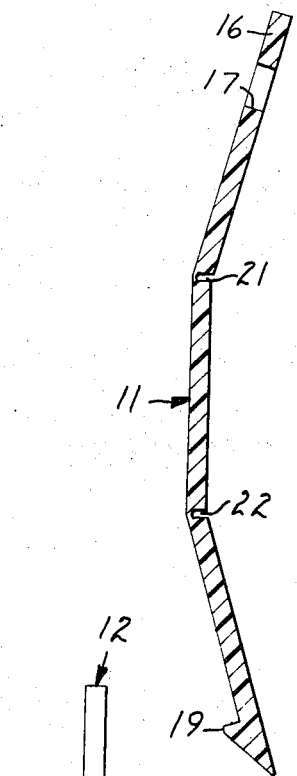
FIG. 4 is a sectional view taken along the lines 4—4 of FIG. 3.
Figure 5:
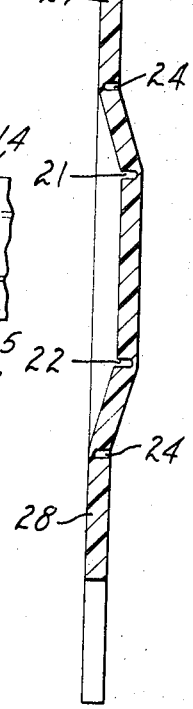
FIG. 5 is a section taken along the line 5—5 of FIG. 3.

The fold lines 21, 22, 23 and 24 are formed of grooves in the material and have the shape as illustrated in FIGS. 4 and 5. These grooves are not so formed that the narrow rectangular portions may fold toward each other a distance greater than approximately 90° before the opposite edges of the groove engage. Further, bending of the narrow portions of the blank 11 cause a slight distortion of the material of the blank giving the material a resiliency which is utilized to maintain the hooks 19 engaged with the eyelets formed by the slotted ears 16. This is shown in FIG. 2 and the slightly warped configuration which results as shown in FIG. 1. The stress on the fastening means however is sufficient to hold the handle in its form having the triangular cross section such that the handle gives strength to itself and maintains the end 12 in its bowl-like shape.

In a preferred embodiment as illustrated, the rectangular portion is not truly rectangular in that the edges 14 and 15 converge toward each other by three degrees, however, the two fold lines are parallel with the adjacent edge walls 14 and 15. Near the end of the rectangular portion, where the diverging portions of groove 24 meet the edges 14 and 15, the edges 14 and 15 diverge again forming triangular areas 28 and 29 which join the circular edge of the bulbous end and draw the same into a bowl about the end of the handle at fold line 23. An eyelet 16 and hook 19 are positioned on the handle portion near the positions where the diverging portions of groove 24 meet the edges 14 and 15.

The blank is preferably formed of polypropylene and has a thickness of preferably about 0.032 inch and the grooves 21, 22 and 24 extend into the material leaving only 0.005 inches of material to be folded. With the preferred material however this provides a hinge section which is very durable and which can withstand numerous flexings without breaking. Other materials are suitable but they will not stand the number of flexings which may be desired. After the spoon is once folded it may not be necessary to form it again as it can be discarded. In the event the food product is relatively stiff and strong pressure is applied to the spoon, one of the fastening members may come lose. The tear strength of polypropylene lets the fastening means come lose before it will tear from the utensil.

Figures 6, 7:
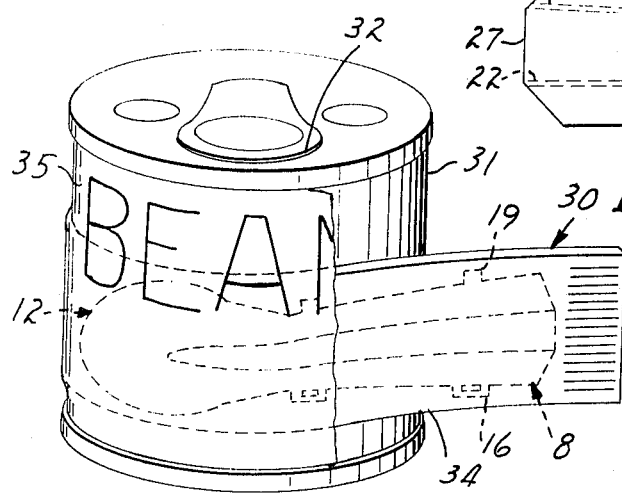
FIG. 6 is a perspective elevational view of the food container and packaged blank according to the present invention.
FIG. 7 is a fragmentary detail view of an alternative embodiment of the spoon.

Enclosure means in which the blank may be packaged is provided to protect the utensil and to provide means for securing the utensil to a container. The enclosure means comprises two thin strips of sheet material between which the blank is sandwiched. The enclosure will provide a package having a utensil blank disposed between the two strips of material which strips may be formed by either a single sheet folded about the blank and sealed or separate sheets which are sealed along the edges, or a sleeve into which the blank is placed and sealed. The enclosure 30, as shown in FIG. 6, can be formed from coated paper, cellphane, or polymeric material. The flexibility of the sheet material and of the blank permits the same to be wrapped about a container 31. The container 31 illustrated is a small cylindrical can having a tear top which is opened by pulling on a handle 32. The package including the container 31, enclosure 30, and the utensil blank, may have the utensil package wrapped around the cylindrical external surface portion of the container 31, and one face 34 of the enclosure 30 may have the product label, with advertising and identification imprinted thereon, or a separate paper label 35, as is conventional, may be placed about the enclosure 30 to hold the utensil package to the container 31. The enclosure 30 may also be held with an adhesive on the surface thereof next to the container, by tape strips on the enclosure and surface, or other suitable attaching means.

The enclosure means may package more than one utensil blank and the containers may have other shapes. For example, the container may be a box containing one of the "easy open" ready to eat foods, cereals, etc. and the utensil may be adhered to the package or with multipackaged foods, a number of utensil blanks may be placed within an outside wrapper, which may be transparent or not. The utensil package may also be folded and secured to the surface of the container, whether a can or box.

The utensil blanks may also be die cut instead of molded. In a die cut blank the fastening means may comprise an eyelet and an arrowhead shaped projection. The arrowhead shaped construction is illustrated in FIG. 7 where an ear 16 having a slot 17 is formed along the edge 14 and a projection 19a with an arrowhead shaped end is formed along the edge 15. The arrowhead will fit, when forced, through the slot and will retain the utensil handle in its folded configuration.

Having thus described the present invention with reference to the accompanying drawing illustrating a preferred embodiment and an alternative, it is to be under- stood that other modifications may be made without departing from the spirit of the present invention.

What is claimed is:

1. A utensil for use with single serving containers of food available from vending machines, said utensil comprising a monolithic thin platelet of irregular shape including a rectangular portion defining the handle portion, a bulbous end at one end of the rectangular portion forming the bowl of the utensil, first and second grooves defining fold lines extending the length of the rectangular portion and converging toward the center of said bulbous end, and dividing the rectangular portion into three narrow areas which areas when the platelet is folded along the fold lines form a handle of triangular cross section, fastening means along the opposed edges of said rectangular portion to secure the lengths in the form of the handle, and a third groove defining a fold line beginning near the center of said bulbous end portion and diverging therefrom toward the edges of said rectangular portion along the converging portions of said first and second fold lines and coacting therewith causing said bulbous portion to curve into a bowl shape about the end of said handle.

2. A utensil according to claim 1 wherein said fastening means includes an eyelet on one edge and a hook-shaped member on the opposite edge.

3. A utensil according to claim 2 wherein said eyelet and hook are at the edges near the positions where the third fold line meets the edges of the rectangular portion.

4. A utensil according to claim 1 wherein the platelet is made of polypropylene.

5. A utensil according to claim 1 wherein the platelet is positioned between two thin strips of flexible sheet material which strips are sealed to enclose the platelet.

6. A container and utensil package for single servings of vendable products, said package comprising:

a container having an external surface, a utensil comprising:

a monolithic thin platelet of irregular shape including a rectangular portion defining the handle portion, a bulbous end at one end of the rectangular portion forming the bowl of the utensil, first and second grooves defining fold lines extending the length of the rectangular portion and converging toward the center of said bulbous end, and dividing the rectangular portion into three narrow areas which areas when the platelet is folded along the fold lines form a handle of triangular cross section, fastening means along the opposed edges of said rectangular portion to secure the lengths in the form of the handle, and a third groove defining a fold line beginning near the center of said bulbous end portion and diverging therefrom toward the edges of said rectangular portion along the converging portions of said first and second fold lines and coacting therewith causing said bulbous portion to curve into a bowl shape about the end of said handle, and enclosure means for packaging the platelet.

7. A package according to claim 6 wherein said enclosure means comprises a pair of thin strips of flexible material sandwiching said platelet and sealed together to form an enclosure.

8. A package according to claim 6 including means for securing the enclosure means to said external surface of said container.

9. A package according to claim 6 wherein said enclosure has printed matter on one surface thereof to define a label.

10. A untensil according to claim 1 wherein said third groove is formed in one side of the platelet and said first and second grooves are formed in the opposite side.

* * * * *